Figure 1:
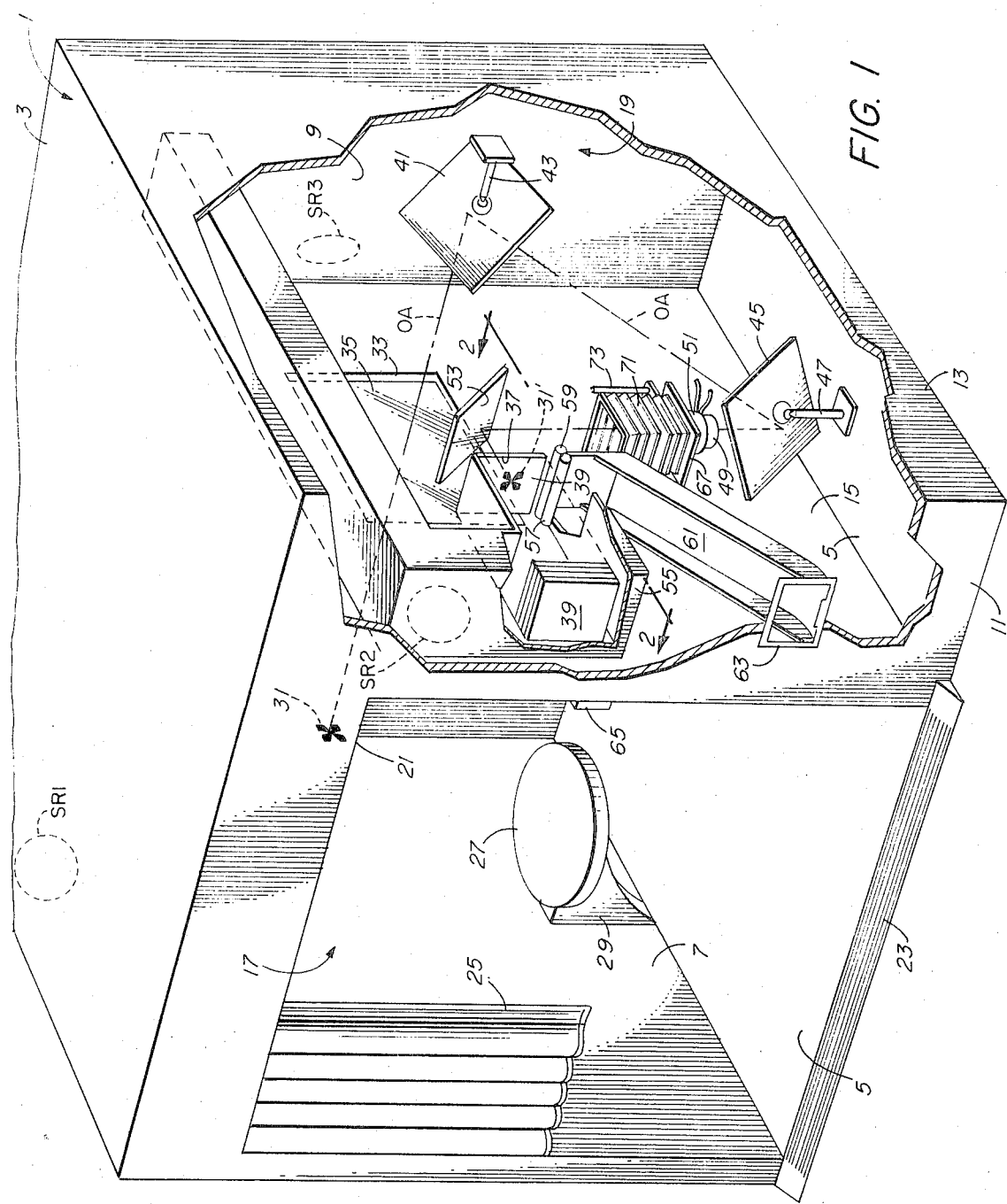

United States Patent [19]
Kennedy et al.

[11] 3,821,760
[45] June 28, 1974

[54] COMPACT AUTOMATIC PHOTOSTUDIO

[75] Inventors: C. Bruce Kennedy; John F. Pasieka, both of Acton, Mass.

[73] Assignee: Polaroid Corporation, Cambridge, Mass.

[22] Filed: Jan. 8, 1973

[21] Appl. No.: 321,668

[52] U.S. Cl. .................................. 95/14, 95/89 R
[51] Int. Cl. ........................................ G03b 17/50
[58] Field of Search ...... 95/14, 89 R; 250/468, 470, 250/471

[56] References Cited
UNITED STATES PATENTS
3,631,781  1/1972  Kennington et al. ............... 95/14
3,693,522  9/1972  Chiesa ................................. 95/14
3,744,389  7/1973  Clark .................................. 95/14
3,744,390  7/1973  Clark .................................. 95/14

Primary Examiner—Richard L. Moses

[57] ABSTRACT

An electronically controlled photostudio in which the user can take a self portrait with studio lighting. The apparatus includes a housing comprising a studio compartment containing a seat for the subject, and a set of strobe lights arranged in a desired portrait array. An apparatus compartment adjacent the studio compartment contains a camera, a set of mirrors defining a folded optical path through which the camera sees the head and shoulders of the user, and apparatus for automatically operating the camera to expose a film unit, and then processing the exposed film unit, when payment for the portrait is deposited by the subject. The finished portrait is presented at a slot in the wall of the housing.

15 Claims, 3 Drawing Figures

COMPACT AUTOMATIC PHOTOSTUDIO

This invention relates to photography, and particularly to a novel portrait studio for producing self-portraits with studio lighting.

Competent portraits by professional photographers command high prices because of their evident superiority to the usual results produced by amateurs. The success of the portrait photographer is obviously determined to some measure by his skill in lighting the particular subject, in directing the subject into the desired pose, and in selecting the precise instant at which the exposure should be made. It seems unlikely that any effective substitute for this measure of skill will be found. However, much of the effectiveness of the professional portrait results from the use of appropriate apparatus in an essentially conventional array. In particular, three lights can be arranged in a conventional manner to produce a pleasing lighting effect that can be used without change for most subjects. A lens of relatively long focal length relative to the size of the image to be made is also highly desirable, because it affords an image of the required size from a distance that offers a satisfying perspective. It is the object of this invention to bring those elements of the professional studio portrait together in such a way that they can be employed by an unskilled person, without the aid of an expert, to make a self portrait to standards approaching those which the expert could maintain.

Briefly, the above and other objects of the invention are attained by a novel self-operated studio construction containing a studio compartment in which there is a posing seat upon which the subject can be seated, and a set of lights prearranged with respect to the seat so that the head and shoulders of the subject will be properly lighted when the subject is seated.

A device is provided that can be actuated by the subject when in readiness to be photographed. For commercial use, this device may take the form of a coin operated mechanism, or other device responsive to the insertion of a dollar bill, a ticket, a token, or other evidence of payment. Alternatively, the actuating device may simply take the form of a switch.

Whatever the form that the actuating device takes, when actuated by the user, a portrait is taken. That is accomplished by photographic apparatus enclosed in a relatively small apparatus compartment adjacent the studio compartment, in which a camera, film units, and control apparatus for the camera and for the strobe lights are located.

When the picture taken device is operated, it causes the shutter of the camera to open, triggers the strobe units to expose the picture, and then closes the shutter. Next, the exposed film unit is ejected through a pair of spreader rolls, which cause processing fluid, included with each film unit in a manner to be described, to be spread inside of the film unit and cause the exposed image to be developed and fixed. As the film unit passes through the spreader rolls, it is ejected into a slot from which the user can extract the finished portrait.

By an arrangement of mirrors to be described, the optical path, between the image plane in the camera and the subject, is made considerably longer than the distance from the camera to the subject in a straight line. This folded optical path permits a relatively long focal lens to be used at a sufficient distance to obtain a pleasing perspective, without requiring a large studio in which to make the exposure.

The apparatus of the invention, and its mode of operation, will best be understood in light of the following detailed description, together with the accompanying drawings, of a preferred embodiment thereof.

Figure 2:
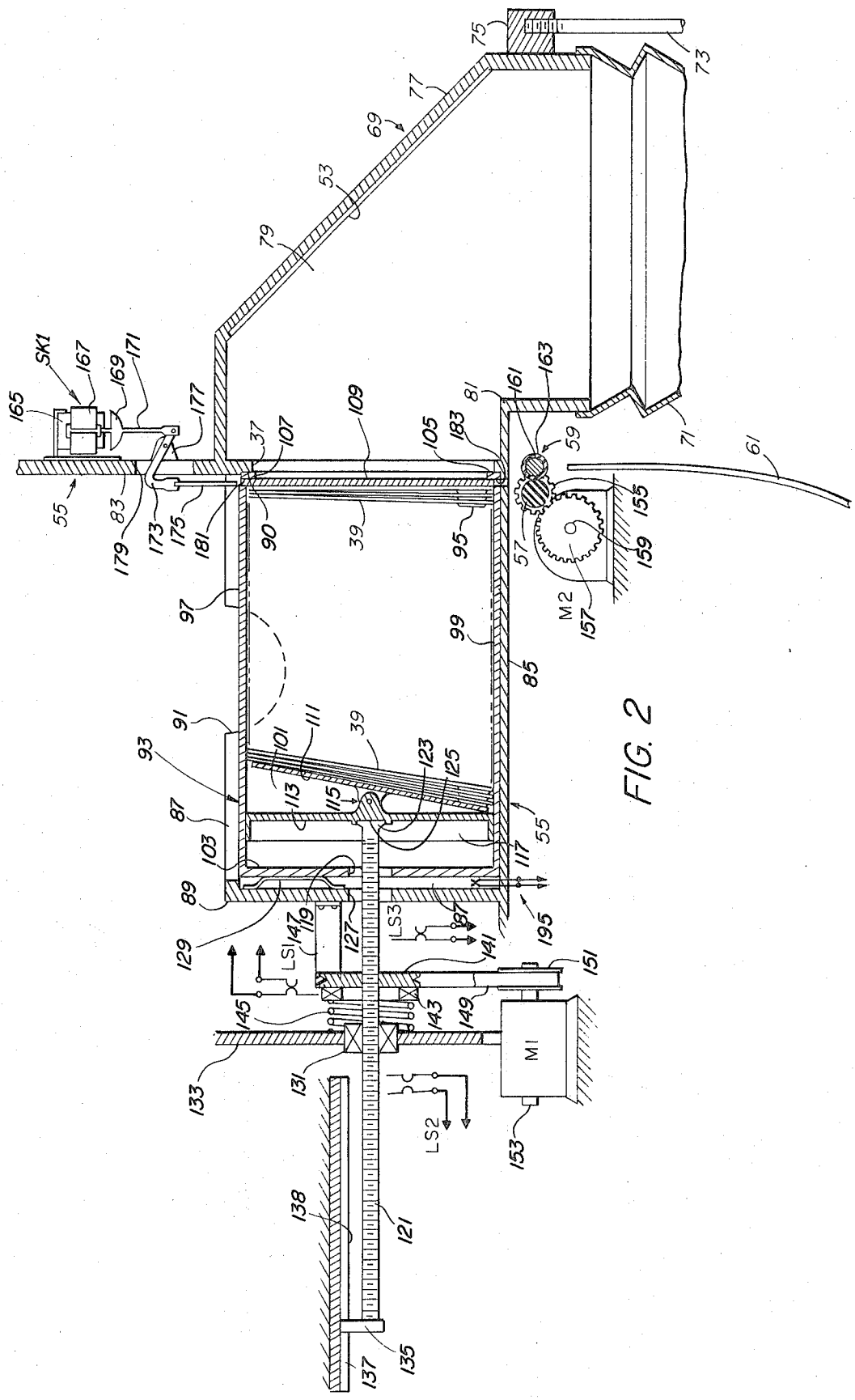
Figure 3:
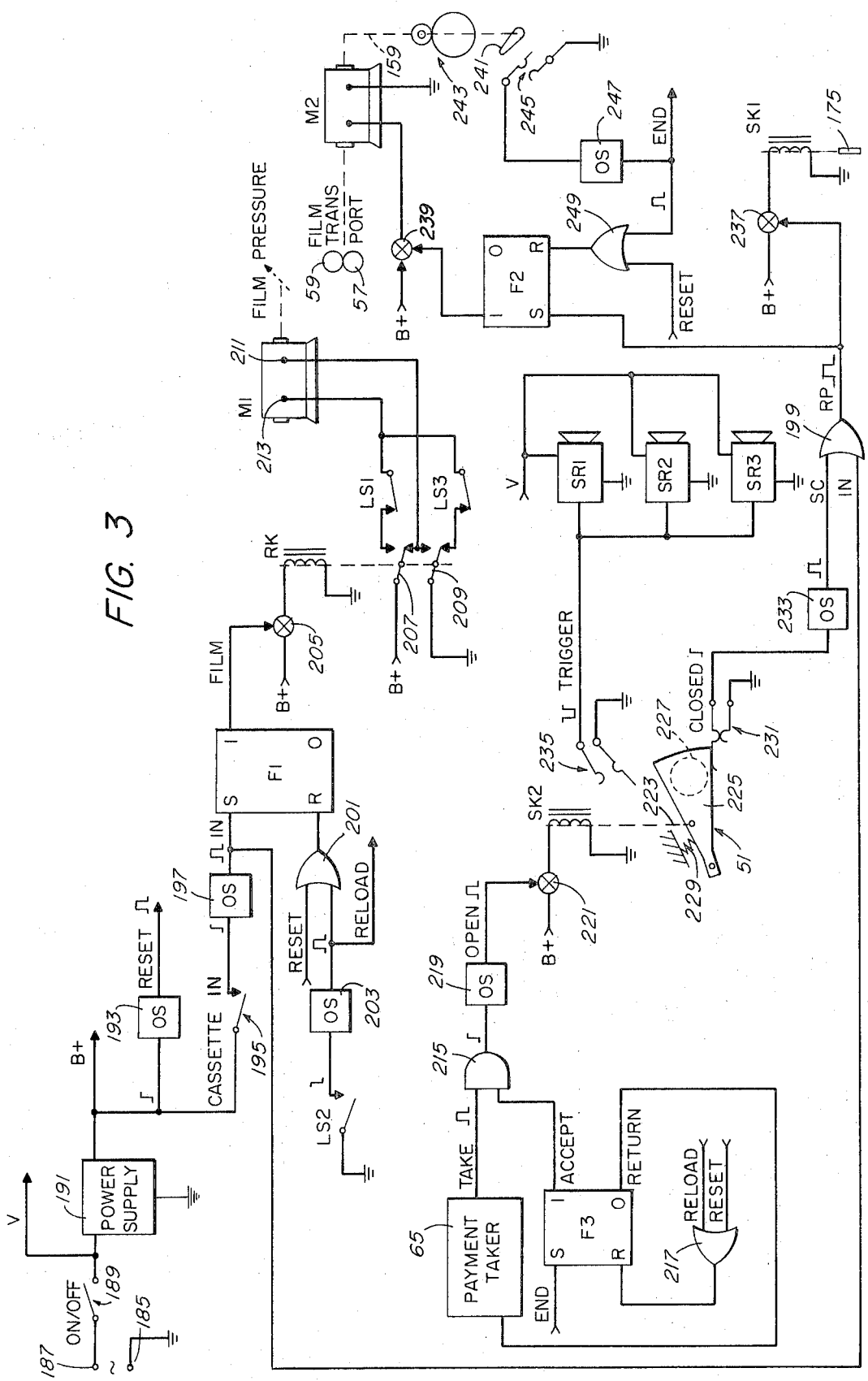

In the Drawings,

FIG. 1 is a schematic perspective sketch, with parts omitted, parts shown in cross section, and parts broken away, of an automatic photographic studio in accordance with the invention;

FIG. 2 is a fragmentary schematic elevational sketch, with parts shown in cross section, parts omitted, and parts broken away, of a camera, and of film transport and processing mechanism therefor, forming a part of the apparatus of FIG. 1, taken substantially along the lines 2—2 in FIG. 1; and FIG. 3 is a schematic block and wiring diagram of control apparatus forming a part of the photographic studio of FIGS. 1 and 2.

As shown in FIG. 1, a photographic studio in accordance with the invention may comprise a housing generally designated 1 and formed by wall means comprising a ceiling panel 3, a floor panel 5, a side panel 7, an end panel 9, a back panel 9, a front panel 11, an end panel 13 opposite the panel 7, and an intermediate panel 15 dividing the housing into studio compartment 17 and an apparatus compartment 19.

The studio compartment 17 is provided with a doorway 21 formed in the front panel 11. A sill 23 may be provided at the entrance to the doorway to serve to fair the floor panel 5 into the surrounding flooring. The doorway 21 is provided with suitable means, shown as curtains 25, which may be drawn across the doorway by the user to reduce the amount of light entering the studio compartment so that a portrait may be taken with the aid of planned internal lights uninfluenced by external ambient light.

Within the compartment 17 there is mounted a stool 27, suitable fixed to the end panel 7 by means schematically indicated as a bracket 29, at a convenient height and position for the subject to sit upon for a head and shoulders portrait.

When the subject is seated on the stool 27, the optical center of the head and shoulders image will be located approximately as indicated by the cross 31. The subject seated on the stool 27 faces a window 33 formed in a dividing panel 15. A half-silvered mirror 35 is mounted in this window 33, wherein the subject can see the image of himself that is to be photographed, while allowing a substantial amount of light to be transmitted through the window 13 into the apparatus compartment 19.

Photographic lighting for the subject seated on the stool 27 may take any conventional form. In accordance with the invention in its preferred embodiment, however, lighting is provided by three strobe lights located as schematically indicated at SR1, SR2 and SR3 in a conventional studio lighting array. These lamps are energized at times to be described to light the subject while the shutter of the camera, to be described, is open.

An optical image 31' of the subject schematically indicated by the cross 31 is focused on an image plane defined by a framing aperture 37 forming a part of the camera, to be described. At this framing aperture 37 is presented the first of a series of film units 39 on which a latent image may be produced. The image 31' of the subject 31 is focused onto the image plane by an optical system comprising a folded path that may be traced along the optical axis OA from the image 31 to a first mirror 41 suitably fixed to the end panel 13 by means schematically indicated as a support 43.

The beam falling on the mirror 41 is reflected to a second mirror 45 suitably fixed to the floor panel 5 by means schematically indicated as a support 47. Light falling onto the mirror 45 is reflected up through a lens 49, through an electronically operated shutter 51 that is opened at times to be described, through a suitable stop determining aperture plate, not shown, and thence to a mirror 53 fixed within the camera, to be described, and finally to the image plane on which the image 31' is focused.

In an alternative arrangement of the parts, the mirrors 41, 45 and 53 could all be placed on the same side of the lens 49. The image plane would then be normal to the optical axis of the lens. In either arrangement, an odd number of mirrors is needed in the system to produce a correctly oriented image on a film unit of the type which is processed to produce a print directly on the photosensitive side. And an important factor is to dispose the mirrors, lens and image plane so that projections of the folded optical axis, in planes parallel to the plane of the panel 15, are substantially greater than the distance between the panels 15 and 13. The result is a photograph taken from a considerably greater distance than the dimensions of the photostudio would otherwise permit.

The camera, and a cassette comprising a stack of the film units 39, to be described in more detail below in connection with FIG. 2, are mounted in suitable housing, bracket and support means generally designated 55 that are in turn secured to the dividing panel 15 in any conventional manner, not shown in detail. Also supported for rotation on the support means 55 are a pair of spreader rolls 57 and 59 that are adapted to engage a film unit 39 after its exposure and to move it downwardly under pressure.

Pressure on the film unit causes pods of processing composition within the film unit to be distributed throughout its photographically active regions to process the latent image. The processed film unit is ejected from the spreader rolls into a chute 61 suitably mounted in the support brackets 55 for delivery to the user by way of a framed exit slot 63 in the panel 11 where the finished photograph can be removed.

A user-operated device for initiating the taking of a photograph is schematically indicated as a payment taker 65 mounted on the panel 15 in convenient position for access by the subject when seated on the stool 27 to be photographed. The payment taker 65 may take the form of any conventional coin-operated device, a paper currency operated mechanism, a ticket, token or punch card responsive device, or simply a pushbutton switch in any conventional pulse generating network for producing a signal pulse when momentarily depressed.

When actuated, as by the insertion of a coin or of a unit of paper currency, in the particular embodiment to be described, the device 65 produces a positive pulse of voltage with respect to ground that causes the control apparatus, to be described in connection with FIG. 3, to operate in a predetermined cycle. In this operating cycle, the shutter 51 is opened, the strobe units SR1, SR2 and SR3 are triggered, the shutter is then closed, and the exposed film unit 39 is ejected through the spreader rolls 57 and 59 and down the chute 61 to the exit slot 63.

Preferably, the payment taker 65 is inhibited in any conventional manner from accepting the selected token of payment when the apparatus is not in condition for taking portraits, as when the supply of film is exhausted. This inhibiting means may take the form of a pin blocking a coin slot, a switch interrupting the drive motor for a bill feed mechanism, a visible indicator, or any other conventional operation inhibiting device which is commonly found in coin or bill operated admission devices.

Referring next to FIG. 2, certain essential details of the camera and film transport mechanism forming a part of the apparatus of FIG. 1 are shown in more detail. The mechanical ground shown in FIG. 2 refers to the supporting structure 55 generally described in connection with FIG. 1, and comprises suitable brackets, supports and wall members fixed to the dividing panel 15.

Comparing FIGS. 1 and 2, the lens 49 and shutter 51 of the camera may be mounted on a suitable lens board 67. A rigid housing 69, shown in FIG. 2, is connected to the lens board 67 by a conventional light-tight bellows 71.

The lens board 67 may be adjustably secured to the housing 69 by means of a monorail 73 threadably engaged by a suitable support 76 fixed to the upper wall 77 of the housing 69. The housing 69 is further defined by side walls such as 79, and a bottom wall 81, connected to or formed integrally with a wall 83 forming a part of the support apparatus 55.

The framing aperture 37 referred to above is defined by a rectangular aperture in the wall 83, as indicated in FIG. 2. As shown, the mirror 53 is fixed to the wall 77.

Formed integral with or affixed to the other elements of the support means 55 is a generally box-like rectangular film cassette receptacle open at one side and comprising a bottom wall 85, side walls such as 87, an end wall such as 89, and a front wall 90 comprising a recessed portion of the wall 83 in which the framing aperture 37 is formed. The side walls such as 87 are recessed as indicated at 91 to allow an operator to grasp a cassette generally designated 93 to allow its insertion in, and removal from, the receptacle formed by the walls such as 85, 87, and 89.

Each of the cassettes such as 93 contains a supply of film units 39; for example, 400 such film units. Each film unit may be of the type shown and described in U.S. Pat. No. 3,415,644, issued on Dec. 10, 1968 to Edwin H. Land for Novel Photographic Products and Processes, and in copending U.S. application for letters Patent Ser. No. 194,407, filed on Nov. 1, 1971 by Edwin H. Land for Novel Products and Processes and assigned to the assignee of this application. Generally, as is more fully disclosed in the cited patent and application, the film units comprise a number of photosensitive layers in which latent color images can be formed, and other layers which cooperate with the photosensitive layers.

A supply of processing composition is contained in a pod 95 at the end of each of the film units 39. When the film unit is compressed between the spreader rolls 57 and 59, processing composition in the pod 95 is forced between selected layers of the film unit, thereby initiating a diffusion transfer process which develops and fixes the image.

Each cassette 93 comprises a generally rectangular box having a top wall 97, a bottom wall 99, side walls such as 101, and end wall 103, and a front wall 105 in which a rectangular framing aperture 107, cooperating with the framing aperture 37, is formed. A dark slide 109, of black cardboard or the like, is initially mounted in the cassette over the first film unit 39 to protect the film units from light until it is desired to expose them after the cassette 93 has been inserted in the receptacle as shown in FIG. 2.

Because of the additional thickness of the pods 95, the film units 39 tend to stack at progressively increasing angles, as suggested in FIG. 2. In order to accommodate this varying stacking angle, which increases from the dark slide 109 toward the end of the stack, a pressure plate 111 is pivotally connected to a plate 113, as suggested at 115. The plate 113 is provided with side and top flanges 117 that serve as guides, and also form a light trap with the walls of the cassette 93 to protect the film units 39 from exposure to light.

An aperture 119 is formed in the back wall 103 of the cassette 93 to accept a worm 121 having an enlarged head 123 that engages a suitable recess 125 formed in the plate 113. The worm 121 and its head 123 are arranged to be reciprocated from the position shown to a first extreme position in which the last film unit 39 is exposed in the framing aperture 107, and a second extreme position in which the head 123 is withdrawn from the cassette receiving receptacle through an aperture 127 formed in the rear wall 89 of the receptacle. In the last-mentioned position, the head 123 opens a normally closed limit switch LS3, for purposes to be described.

The cassette 93 is held in the position shown in FIG. 2 by a resilient spring 129 fixed to the back wall 89 of the receptacle. The spring 129 resiliently biases the cassette into engagement with the wall 90 so that is framing aperture 107 is in registry with the framing aperture 37 in the camera, and the outermost film unit 39 is in position for receiving a focused image of the subject.

The worm 121 is journalled for rotation and translation along its longitudinal axis in suitable bearings 131 mounted in a wall portion 133 formed integral with the support means 55. The worm is prevented from rotation about its longitudinal axis by a key 135 fixed to the worm and sliding in a keyway 137 formed in a suitable support 138 fixed to or formed integrally with the support means 55.

The worm 121 is threadedly engaged with cooperating threads formed in a central aperture in a pulley 141. The pulley 141 is provided on one side with an annular ball-gearing race, as suggested at 143. The race 143 is engaged by a compression spring 145 extending from the race 143 to the wall 133. The pulley 141 is thus urged by the spring 145 into engagement with a bearing stop 147 mounted on the wall 189.

The pulley 141 is connected by a flexible drive belt 149 to a drive pulley 151 connected to the output shaft 153 of a conventional DC motor M1, mounted on the support means 55 as suggested in FIG. 3. When the motor shaft 153 is rotated in a sense that would cause the pulley 141 to translate the worm 121 to the left in FIG. 2, the pulley 141 remains in bearing engagement with the support 147 and the head 123 of the worm is retracted out of the cassette 93 and through the back wall 89 of the cassette holding receptacle until the limit switch LS3 is opened.

When the shaft 153 is rotated in the opposite sense, the pulley 141 causes the worm 121 to be advanced to the right in FIG. 2, until engagement with the member 113 causes the film units 39 to be driven into a position in which the back force exerted on the spring 145 allows the pulley 141 to move off of the support 147, compressing the spring 145 until a limit switch LS1 is opened for purposes to appear.

When the worm 121 is traversed to the right to a distance just past which the last film unit 39 has been positioned in the framing aperture 107, a limit switch LS2 is closed by the key 135, to cause operation of the system to be interrupted in a manner to be described. Broadly speaking, this arrangement allows a substantially constant pressure to be applied to the stack of film units 39 as they are advanced towards the framing aperture for sequential exposure.

The spreader roll 57, which may be of stainless steel or the like, is journalled in suitable bearings, not shown, mounted on the support means 55. A drive gear 155 is affixed to the spreader roll 57, and is drivably engaged by a gear 157 connected to the output shaft 159 of a conventional DC motor M2. The motor M2 is fixed to the support means 55, as schematically indicated.

The drive roll 59 is also journalled in the support means 55 in any conventional manner, not shown. The roll 59 may comprise a stainless steel core 161 covered with an outer resilient layer 163 of friction material, such as polyurethane or the like. By that arrangement, when the motor M2 drives the gears 157 and 155, the rolls 57 and 59 are rotated in opposite directions to advance a film unit into the chute 61.

The dark slide 109, and the film units 39, are sequentially advanced to the rolls by means schematically indicated as a solenoid SK1 having a core 165 mounted on the wall 83 and provided with windings such as 167. When the windings 167 are energized, an armature 169 is attracted to the core 165. The armature 169 is formed integrally with an output shaft 171 connected through a lever 173 to a picker arm 175.

The lever 173 is pivotally mounted on the wall 83 by means of a support schematically indicated at 177, and extends through the wall through an aperture 179. When the solenoid SK1 is energized, the picker arm 175 comes down through an entrance slot 181 formed in the top wall 97 of the cassette to eject the dark slide 109, or the film unit 39 in its position, downwardly through an exit slot 183 formed in the bottom wall 99 of the cassette 93, and a corresponding registering slot formed in the wall 85, into the bite of the spreader rolls 57 and 59 so that it can then be transported out through the chute 61 to the exit slot 63 in FIG. 1. This operation will be made clear in the context of the following description of the control system for the apparatus, shown in FIG. 3.

Referring to FIG. 3, the system is supplied with power by a conventional alternating current source; for example, by a 120 volt, 60 Hz source. Voltage from this source is applied between a grounded terminal 185 and a second terminal 187. An on/off switch 189 is connected between the terminal 187 and the active input terminal of a power supply 191 of any conventional construction. The power supply functions in a conventional manner to produce a DC supply voltage at a potential B+ when the switch 189 is closed. Closure of the switch 189 also applies the alternating line potential V to the strobe units SR1, SR2, and SR3, as schematically indicated, where it is converted to direct current to cause charging of storage capacitors in the strobe units in a conventional manner.

When the switch 189 is first closed and the power supply voltage output rises to the potential B+, the rising transition triggers a conventional one shot multivibrator 193 to produce a RESET pulse that is positive with respect to ground. That pulse is employed in a manner to be described to insure that the apparatus is in a predetermined standby condition when the power is first turned on.

When a cassette is in the receptacle of FIG. 2, a switch 195 is closed. Closure of this switch when B+ is present causes a rising transition. A transition to B+ when the switch 195 is closed and a cassette is already in position also produces a rising transition. Either of these transitions triggers a conventional one shot multivibrator 197 to produce a pulse labeled IN.

The IN pulse is applied to the set input terminal S of a conventional flip-flop F1, causing the flip-flop F1 to produce a logic 1 signal, labeled FILM, that is positive with respect to ground, at its logic 1 output terminal, for purposes to be described. The IN pulse is also applied to one input terminal of a conventional OR gate 199, causing that gate to produce a positive going output pulse, labeled RP, for purposes to be described.

The flip-flop F1 is arranged to be reset when a conventional OR gate 201 produces a logic 1 output signal. That causes the signal FILM to disappear, as the logic 1 output terminal of the flip-flop F1 goes essentially to ground potential in the reset state. The gate 201 receives the RESET pulse produced by the multivibrator 193, and also receives a pulse labeled RELOAD produced at times by a conventional one shot multivibrator 203.

The multivibrator 203 is triggered to produce the RELOAD pulse when the limit switch LS2 is closed. Closure of the switch LS2 applies a ground level current sink to the input terminal of the multivibrator 203.

The signal labeled FILM at the logic 1 output terminal of the flip-flop F1 is applied to the control terminal of a conventional electronic switch 205 of any conventional construction, such as a transistor or the like, connected between the supply terminal at B+ and one terminal of the winding of a conventional relay RK. The other terminal of the winding of the relay RK is connected to ground.

When closed by the presence of the signal FILM, the switch 205 supplies operating current to the relay RK to cause it to pick up its contacts 207 and 209, which are normally in the position shown in FIG. 3 when the relay is de-energized. The armature of the contacts 207 is connected to the supply terminal at B+, and the armature of the contacts 209 is connected to ground. The position of these contacts determine the direction of current flow to the windings of the motor M1, and thus select the direction of operation of the motor.

When the relay RK is de-energized, as shown in FIG. 3, the supply terminal at B+ is connected over the contacts 207 to one terminal 211 of the motor M1. The other terminal 213 of the motor M1 is returned to ground over the normally closed contacts of the limit switch LS3, and over the contacts 209 of the relay RK that are engaged in the released condition of the relay. When the relay RK is energized, B+ is supplied over the contacts 207, and the normally closed contacts of the limit switch LS1, to the terminal 213. The terminal 211 of the motor is then connected to ground over the front contacts 209 of the relay RK. By this arrangement, it is apparent that the motor M1 will run in one direction or the other, depending on the energized or de-energized condition of the relay RK, until the limit switch in the effective circuit is opened. That causes constant film pressure to be applied to the film units 39 in the cassette 93, in a manner to be described below.

The payment taker 65, when actuated by insertion of a coin or bill, or simply by actuation of a switch in the manner described above, produces a signal labeled TAKE that is a positive pulse with respect to ground. As discussed above, this signal is preferably inhibited by a RETURN signal when that signal is applied to the payment taker 65.

The TAKE signal is applied to one input signal of a conventional AND gate 215. The second input terminal of the gate 215 receives a signal labeled ACCEPT, that is present as a positive level with respect to ground when a conventional flip-flop F3 is set.

The flip-flop F3 is arranged to be set by a signal labeled END, produced in a manner to be described, and to be reset by a logic 1 signal produced at the output terminal of a conventional OR gate 217. The gate 217 receives the signals RELOAD and RESET, produced in the manner described above.

When the flip-flop F3 is reset, it produces a logic 1 signal labeled RETURN at its logic 0 output terminal. The RETURN signal is employed to disable the payment taker 65, as described above.

When the ACCEPT signal is present, and the TAKE pulse is produced, the gate 215 produces a rising transition at its output terminal that triggers a conventional one shot multivibrator 219 to produce a positive pulse with respect to ground labeled OPEN. When present, the OPEN pulse causes a conventional electronic switch 221 to be closed, supplying operating current from the supply terminal at B+ to the winding of a conventional solenoid SK2.

The solenoid SK2 has an armature schematically indicated at 223 operatively connected to a shutter blade 225, of any conventional construction, that is normally urged into a closed position, in which it covers the aperture 227 in the lens 49 of FIG. 1, by a spring 229. The shutter blade 225 swings upwardly against the action of the spring 229 when the solenoid SK2 is energized, to expose the aperture 227 and allow a latent image to be formed on the outermost film unit 39.

In the position of the parts shown, the blade 225 closes a switch 231 which is connected between ground and the active input terminal of a conventional one shot multivibrator 233. When the blade 225 opens, the switch 231 is opened. When the shutter blade 225 again closes, the switch 231, in closing, produces a groundward-going transition that triggers the multivibrator 233 to produce a positive going output pulse labeled SC.

When the shutter 225 fully opens the aperture 227, it momentarily closes a switch 235 to produce a ground level current sink, labeled TRIGGER, that triggers the strobe units SR1, SR2, and SR3 simultaneously, to produce the desired flash exposure of the subject.

Either the pulse SC or the pulse IN causes the gate 199 to produce a pulse labeled RP. When present, the pulse RP causes a conventional flip-flop F2 to be set. It also briefly closes a conventional electronic switch 237, to supply current from the supply terminal at B+ through the windings of the solenoid SK1 to ground. As described above, when energized, the solenoid SK1 operates the picker arm 175 in FIG. 2 to advance the dark slide, or a film unit, to the spreader rolls.

The flip-flop F2 is arranged to be reset by a conventional OR gate 237 that receives the RESET pulse, and also receives the IN pulse. When set, a positive signal at the logic 1 output terminal of the flip-flop F2 closes a conventional electronic switch 239 to supply operating current from the supply terminal at B+ to the windings of the motor M2. The motor M2 drives the spreader rolls 59 and 57 in the manner described above.

The output shaft 159 of the motor M2 also drives an arm 241, through reduction gearing schematically indicated at 243, such that each time the motor M2 has rotated through an angle corresponding to a complete film transport cycle, in which a film unit has been processed and ejected into the chute 61, the arm 241 momentarily closes the switch 245 to supply a ground going transition to trigger a conventional one shot multivibrator 247. When triggered, the multivibrator 247 produces the positive END pulse for the purposes described above.

Operation of the system of the invention will next be described, with reference to FIGS. 1 through 3.

Referring first to FIG. 3, assuming that the switch 189 is open, all of the components will be deenergized, the shutter blade 225 will be in its aperture closing position, the solenoids SK1 and SK2 will be deenrgized, and the relay RK and the motors M1 and M2 will be deenergized. Assume next that the on/off switch 189 is closed, but that no cassette 93 is in the receptacle. That will cause a RESET pulse to be produced and thereby reset the flip-flops F1, F2 and F3. No further operation will take place.

With the relay RK de-energized, the limit switch LS3 will be opened, because the worm 121 will be in its extreme position to the left in FIG. 2, in which the head 123 opens the switch LS3. If it happens that the worm is not in that position, the motor M1 will run in the direction to cause the worm 121 to move to that position, and open the switch LS3.

With the flip-flop F3 reset, the RETURN signal applied to the payment taker 65 will inhibit operation of the apparatus by the user. Thus, a coin, bill, ticket or other token will not be accepted, and no TAKE signal will be produced.

Assume next that a cassette 93 is inserted in the receptacle in FIG. 2, against the force of the spring 129, causing the switch 195 to be closed. Referring to FIG. 3, when the cassette switch 195 is closed, the rising transition will trigger the multivibrator 197 to produce the IN pulse. The IN pulse will set the flip-flop F1, and cause the gate 199 to produce a pulse RP.

With the flip-flop F1 set, the signal FILM will be produced to close the switch 205 and energize the relay RK. That will cause motor M1 to run in a direction to advance the worm 121 to the right in FIG. 2 until the head 123 encounters the recess 125 in the plate 113 and begins to apply pressure to the film units 39 through the pressure plate 111.

The motor M1 will continue to operate in this direction until pressure on the spring 145 causes the pulley 141 to move over and open the limit switch LS1. The motor M1 will then stop. As film units are later ejected, the pressure on the plate 111 will diminish, allowing the pulley 141 to move over until the switch LS1 is again closed. That will cause the motor M1 to begin to rotate again, until the worm 121 is moved enough to the right in FIG. 2 to again establish the desired pressure on the film units 39. Operation of the motor M1 in this fashion will continue so long as the cassette 93 contains a film unit 39.

The pulse RP produced by the gate 199 will set the flip-flop F2, causing the switch 239 to be closed and the film transport motor M2 to operate. At the same time, the pulse RP will close the switch 237 and energize the solenoid SK1 to operate the picker arm 175 in FIG. 2 and eject the dark slide 109 down into the bite of the spreader rolls 57 and 59, which are now rotating under the influence of the motor M2.

The dark slide will be ejected, and the motor M2 will continue to operate until the dark slide is passed down into the chute 61. Referring again to FIG. 3, the switch 245 will then be closed by the arm 241, causing the one shot multivibrator 247 to produce the END pulse. That pulse, applied through the gate 249, will reset the flip-flop F2, causing the switch 239 to open and stop the motor M2.

The END pulse will also set the flip-flop F3 to produce the signal labeled ACCEPT that will enable the gate 215 to respond to a TAKE pulse produced by the payment taker 65. The apparatus is now in its standby condition, awaiting use.

Next, assume that a subject enters the studio compartment 17 in FIG. 1, is seated upon the stool 27, and inserts payment in the payment taker 65. The subject should be instructed not to insert payment until he sees his image as desired in the half-silvered mirror 35 in FIG. 1.

Referring again to FIG. 3, when payment is received by the payment taker 65, the TAKE pulse will be produced. In the presence of the signal ACCEPT, the gate 215 will produce a rising output transition that will trigger the multivibrator 219. That will produce the OPEN pulse that closes the switch 221 and energizes the solenoid SK2.

When the solenoid SK2 is energized, the shutter blade 225 will move upwardly to exposure the aperture 227, opening the switch 231. When the shutter 227 reaches it fully opened position, it will close the switch 235 to produce the TRIGGER signal and thereby trigger the strobe units SR1, SR2, and SR3, exposing the uppermost film unit 239 in the framing apertures 37 and 107 in FIG. 2.

After the OPEN pulse, the switch 221 will be opened and the solenoid SK2 will be de-energized, allowing the shutter blade 225 to return to its closed position under the influence of the spring 229. When it does so, the switch 231 will be closed to produce a falling transition that will trigger the one shot multivibrator 233. When triggered, the multivibrator 233 produces a pulse SC, causing the gate 199 to produce the pulse RP. The pulse RP will set the flip-flop F2 and close the switch 237 as before, causing the switch 239 to be closed to operate the motor M2, and the solenoid SK1 to be energized to operate the picker arm 175. The exposed film unit 39 will then be advanced to and driven through the spreader rolls 57 and 59, causing processing of the film unit.

When the processed film unit is ejected into the chute 61, the switch 245 will be closed as described above to produce the END pulse. The END pulse will reset the flip-flop F2 to stop the motor M2. It is also applied to the set input terminal of the flip-flop F3, but will produce no change because that flip-flop is already set and producing the ACCEPT level.

Operation of the apparatus to take subsequent portraits will be the same as that just described for the first, until the supply of film units 39 is exhausted and the worm 121 reaches the position at which the key 135 closes the limit switch LS2. Referring to FIG. 3, the swtich LS2, when closed, will triger the multivibrator 203 to produce the RELOAD pulse that resets the flip-flop F1 through the gate 201, and resets the flip-flop F3 through the gate 217.

When the flip-flop F3 is reset, the ACCEPT level will be absent and the RETURN level will be present, so that the payment taker 65 is no longer functional to accept payment and produce a take signal. With the flip-flop F1 reset, the signal FILM will be removed and the switch 205 will be open. The relay RK will accordingly be released, and the motor M1 will start to run in the reverse direction, moving the worm 121 to the left in FIG. 2, until the head 123 moves back out of the cassette and out of the back wall 89 of the cassette receptacle to open the limit switch LS3.

When the switch LS3 opens, referring to FIG. 3, the motor circuit will be interrupted and the motor M1 will stop. The apparatus will remain in that condition until a new cassette is loaded into the receptacle, whereupon operation will commence as described above.

While the invention has been described with respect to the details of a particular embodiment thereof, many changes and variations will occur to those skilled in the art upon reading the description, and such can obviously be made without departing from the scope of the invention.

Having thus described the invention, what is claimed is:

1. A studio camera for making a photograph at a distance from the subject that is greater than the distance from the subject to the focal plane of the camera, comprising means forming a compartment comprising a first panel adapted to face the subject, and a second panel parallel to said first panel, means forming an entrance aperture in said first panel through which light falling on the subject can be transmitted, a first mirror mounted in said compartment adjacent said entrance aperture to reflect light entering through said entrance aperture at an angle to its entrance path, a housing mounted in said compartment, a lens mounted in said housing, means forming a framing aperture defining an image plane in said housing, a second mirror mounted in said housing in position to direct light entering said housing through said lens through said framing aperture, a third mirror mounted in said compartment to direct light reflected from said first mirror through said lens to said second mirror, said lens being located at a distance from said framing aperture selected to focus an image of a subject at a predetermined distance from said first panel onto said image plane, shutter means selectively operable to block and unblock said lens, and means for placing the photosensitive surface of a film unit in said image plane for exposure when said shutter means is operated to unblock and then block said lens.

2. The apparatus of claim 1, in which the folded optical path from said entrance aperture to said first mirror, from said first mirror to said third mirror, from said third mirror to said second mirror, and from said second mirror to said image plane, has projections in planes parallel to said first panel substantially greater in total length that the distance between said panels.

3. A studio camera for sequentially exposing a series of discrete film units each containing a supply of processing fluid adapted to be spread within the film unit to produce a finished photograph on the film unit, comprising means forming an apparatus compartment, means forming an entrance aperture in said compartment, a housing mounted in said compartment, means forming a framing aperture in said housing, first film transport means operable to advance a stack of film units into registry with said framing aperture, optical means for focusing an image of a subject outside of said compartment and visible through said entrance aperture over an optical path through said housing onto a film unit at an end of said stack adjacent said framing aperture, means forming an exit aperture in said compartment, second film transport means operable to eject the film unit at said end of said stack from said stack and advance the film unit to said exit aperture, said second film transport means comprising means for exerting pressure on the film unit during ejection to spread processing fluid within the film unit, shutter means sequentially operable to unblock and then block said optical path, and means responsive to sequential operation of said shutter means for operating said second film transport means, in which said first film transport means comprises means for exerting a substantially constant pressure on said stack as film units are ejected by said second film transport means.

4. The apparatus of claim 3, in which said second film transport means comprises a pair of spreader rolls, means rotatably mounting said spreader rolls in said compartment adjacent said framing aperture in position to receive a film unit on which an image has been recorded and drive the film unit under pressure to said exit aperture when said rolls are rotated, and motor means mounted in said compartment and operatively connected to said rolls, said motor means being operable to rotate said rolls.

5. A photostudio, comprising wall means forming a housing divided into a studio compartment and an apparatus compartment, means forming a window in said wall means intermediate said compartments through which a subject in said studio compartment can be seen, and photographic apparatus in said apparatus compartment for recording an image of a subject in said stuio compartment, said photographic apparatus comprising a lens, image locating means forming a frame aperture defining an image plane on which an image to be recorded is focused by said lens, an odd number of at least three mirrors, means mounting said mirrors, said lens, and said image locating means in spaced relation along a folded optical path in said apparatus compartment to direct light transmitted by said window through a series of reflections from said mirrors and through said lens, said lens being located in position to focus an image of a subject in said studio compartment on said image plane, container means for holding a stack of film units in registry with said image locating means to record images focused on said image plane, adjustable means for exerting a controllable pressure on a stack of film units in said container means to urge the stack toward said image locating means, means responsive to the pressure exerted by said adjustable means for adjusting said adjustable means to keep said pressure substantially constant, shutter means for selectively blocking and unblocking said optical path, means forming an exit slot in said wall means in said apparatus compartment, a pair of spreader rolls, means rotatably mounting said spreader rolls in said apparatus compartment adjacent said image locating means in position to receive a film unit on which an image has been recorded and drive the film unit under pressure toward said exit slot, means operable by a subject in said studio compartment to sequentially actuate said shutter means to unblock said optical path and then to block said optical path, and means actuated when said shutter means blocks said optical path for advancing the film unit adjacent said image locating means into engagement with said spreader rolls and simultaneously rotating said spreader rolls to drive the film unit under pressure toward said exit slot.

6. An electronic photostudio, comprising wall means forming a first housing divided into a studio compartment and an apparatus compartment, means forming an entrance aperture between said compartments through which light falling on a subject in said studio compartment can be transmitted to said apparatus compartment, a first mirror mounted in said apparatus compartment adjacent said entrance aperture to reflect light entering through said entrance aperture at an angle to its entrance path, a second housing mounted in said apparatus compartment, a lens mounted in said second housing, means forming a framing aperture defining an image plane in said second housing, a second mirror mounted in said second housing in position to direct light entering said housing through said lens through said framing aperture, a third mirror mounted in said apparatus compartment to direct light reflected from said first mirror through said lens to said second mirror; said lens being located at a distance from said framing aperture selected to focus an image of a subject at a predetermined distance from said entrance aperture onto said image plane, shutter means selectively operable to block and unblock said lens, and means for placing the photosensitive surface of a film unit in said image plane for exposure when said shutter means is operated to unblock and then block said lens.

7. The apparatus of claim 6, in which the folded optical path from said entrance aperture to said first mirror, from said first mirror to said third mirror, from said third mirror to said second mirror, and from said second mirror to said image plane is substantially greater in total length than the distance between said image plane and a subject at said predetermined distance from said entrance aperture.

8. A studio camera for sequentially exposing a series of discrete film units each containing a supply of processing fluid adapted to be spread within the film unit to produce a finished photograph on the film unit, comprising means forming an apparatus compartment, means forming an entrance aperture in said compartment, a housing mounted in said compartment, means forming a framing aperture in said housing, optical means for focusing an image of a subject outside of said compartment and visible through said entrance aperture over an optical path through said housing onto a film unit at an end of a stack adjacent said framing aperture, means forming an exit aperture in said compartment, means for holding a stack of film units with a film unit at one end of the stack in registry with said framing aperture, first film transport means operable to eject the film unit at said end of said stack from said stack and advance the film unit to said exit aperture, said first film transport means comprising means for exerting pressure on the film unit during ejection to spread processing fluid within the film unit, second film transport means for exerting a substantially constant pressure on a stack of film units in said holding means to urge the stack toward said framing aperture with a uniform force as film units are ejected from said stack, shutter means sequentially operable to unblock and then block said optical path, and means responsive to sequential operation of said shutter means for operating said film transport means.

9. The apparatus of claim 8, in which said second film transport means comprises pressure exerting means for exerting a controllable pressure on a stack of film units in said holding means, and means responsive to the pressure on a stack of film units in said holding means for adjusting said pressure exerting means.

10. A photostudio, comprising wall means forming a housing divided into a studio compartment and an apparatus compartment, means forming an entrance aperture between said compartments through which a subject in said studio compartment can be seen from said apparatus compartment, means forming a framing aperture defining an image plane in said apparatus compartment, means for holding a stack of film units each containing a charge of processing composition adjacent said framing aperture with a film unit at one end of the stack in said image plane, first film transport means in said apparatus compartment and operable to transport a film unit from said image plane over a predetermined path while exerting pressure on the film unit to distribute the processing composition through the film unit, second film transport means in said apparatus compartment and operable to move a stack of film units held adjacent said framing aperture toward said image plane as film units are transported out of said image plane by said first film transport means, said second film transport means comprising adjustable means for exerting pressure on a stack of film units held adjacent said framing aperture and means responsive to the pressure exerted by said adjustable means for adjusting said adjustable means to maintain a substantially constant pressure on the stack, optical means in said apparatus compartment for focusing an image of a subject in said studio compartment onto said image plane over an optical path through said entrance aperture, shutter means in said apparatus compartment and sequentially operable to unblock and then block said path, and sequencing means operable by a subject in said studio compartment for sequentially operating said shutter means and said first film transport means.

11. The apparatus of claim 10, further comprising illuminating means in said studio compartment and operable to illuminate a subject in said studio compartment, and means controlled by said sequencing means for operating said illuminating means when said optical path is unblocked by said shutter means.

12. The apparatus of claim 11, in which said optical path is folded, and in which said optical means comprises a lens and an odd number of mirrors mounted in said apparatus compartment along said folded path.

13. The apparatus of claim 12, in which said first film transport means comprises a pair of spreader rolls, means rotatably mounting said spreader rolls in said apparatus compartment adjacent said framing aperture in position to receive a film unit in which an image has been recorded and drive the film unit under pressure along said predetermined path, and means actuated when said shutter means blocks said optical path for advancing a film unit in said image plane into engagement with said spreader rolls and simultaneously rotating said spreader rolls to drive the film unit under pressure along said predetermined path.

14. A photostudio, comprising wall means forming a housing divided into a studio compartment and an apparatus compartment, means forming an entrance aperture between said compartments through which a subject in said studio compartment can be seen from said apparatus compartment, means forming an image-recording station in said apparatus compartment, optical means for focusing an image of a subject in said studio compartment on said image-recording station over an optical path through said entrance aperture, first film transport means for sequentially advancing a stack of film units to said image-forming station, second film transport means operable to move a film unit away from said image-forming station and out of a stack advancing toward said image-forming station, shutter means sequentially operable to unblock and then block said optical path, sequencing means operable to sequentially operate said shutter means and operate said second film transport means, and means operable by a subject in said studio compartment for operating said sequencing means, in which said optical path is folded, and in which said optical means comprises a first mirror mounted in said apparatus compartment adjacent said entrance aperture to reflect light entering through said entrance aperture at an angle to its entrance path, a lens mounted in said apparatus compartment, a second mirror mounted at a vertex of said optical path between said lens and said image-recording station to direct light passing through said lens onto said image-recording station, and a third mirror mounted in said apparatus compartment in position to direct light reflected from said first mirror through said lens to said second mirror.

15. A studio camera for sequentially exposing a series of discrete film units each containing a supply of processing fluid adapted to be spread within the film unit to produce a finished photograph on the film unit, comprising means forming an apparatus compartment, means forming an entrance aperture in said compartment, a housing mounted in said compartment, means forming a framing aperture in said housing, first film transport means operable to exert a controllable pressure on a stack of film units to advance the film units into registry with said framing aperture, means responsive to the pressure exerted by said film transport means for controlling said film transport means to regulate said pressure, optical means for focusing an image of a subject outside of said compartment and visible through said entrance aperture over an optical path through said housing onto a film unit at an end of said stack adjacent said framing aperture, means forming an exit aperture in said compartment, second film transport means operable to eject the film unit at said end of said stack from said stack and advance the film unit to said exit aperture, said second film transport means comprising means for exerting pressure on the film unit during ejection to spread processing fluid within the film unit, shutter means sequentially operable to unblock and then block said optical path, and means responsive to sequential operation of said shutter means for operating said second film transport means.

* * * * *